United States Patent
Erdmann et al.

(10) Patent No.: US 10,366,245 B2
(45) Date of Patent: Jul. 30, 2019

(54) GREEN POWER FOR DENSE LARGE NETWORKS (PROXY TABLE SCALING)

(71) Applicant: SIGNIFY HOLDING B.V., Eindhoven (NL)

(72) Inventors: Bozena Erdmann, Eindhoven (NL); Koen Johanna Guillaume Holtman, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 135 days.

(21) Appl. No.: 15/228,103

(22) Filed: Aug. 4, 2016

(65) Prior Publication Data
US 2017/0047982 A1     Feb. 16, 2017

(30) Foreign Application Priority Data

Aug. 12, 2015  (EP) .................................. 15180700

(51) Int. Cl.
*H04B 7/14*     (2006.01)
*G06F 21/62*    (2013.01)
(Continued)

(52) U.S. Cl.
CPC ....... *G06F 21/6209* (2013.01); *H04B 7/2606* (2013.01); *H04L 61/2596* (2013.01); *H04L 61/6095* (2013.01); *G06F 2221/2149* (2013.01); *H04L 61/6081* (2013.01); *H04L 67/12* (2013.01); *H04W 48/20* (2013.01); *H04W 84/047* (2013.01); *H04W 84/12* (2013.01); *H04W 84/18* (2013.01)

(58) Field of Classification Search
CPC ...................................................... H04B 7/14
See application file for complete search history.

(56) References Cited

U.S. PATENT DOCUMENTS

| 8,520,618 B2* | 8/2013 | Lee ......................... H04L 5/003 370/329 |
| 9,921,559 B2* | 3/2018 | Tsubota ................. G05B 19/00 |

(Continued)

FOREIGN PATENT DOCUMENTS

| JP | 2011044930 A | 3/2011 |
| JP | 2012134617 A | 7/2012 |

(Continued)

OTHER PUBLICATIONS

"Introducing ZigBee PRO's new eco-friendly 1-15 Green Power Feature", Jan. 22, 2013, XP055163733, http://zigbee.org/zigbee-for-developers/network-specifications/zigbeepro/.

*Primary Examiner* — Parth Patel (57) ABSTRACT

The present invention relates to a system and method for managing proxy device assignment in a wireless communication network where proxy devices operate as relay devices forwarding signals from a resource restricted device to a destination device. The method comprises dividing an identifier space of the resource restricted device into at least two parts, and assigning at least one of the at least two parts of the identifier space to at least one proxy device of the wireless communication network wherein the proxy device assigned to a first part of the identifier space is responsible for the resource restricted device transmitting a signal comprising an identifier falling within the first part of the identifier space.

15 Claims, 3 Drawing Sheets

(51) Int. Cl.
*H04L 29/12* (2006.01)
*H04B 7/26* (2006.01)
H04W 48/20 (2009.01)
H04W 84/04 (2009.01)
H04W 84/18 (2009.01)
H04L 29/08 (2006.01)
H04W 84/12 (2009.01)

(56) References Cited

U.S. PATENT DOCUMENTS

| | | | | |
|---|---|---|---|---|
| 2005/0247779 A1* | 11/2005 | Ohkubo | ............ | G06K 7/10346 235/383 |
| 2006/0154598 A1* | 7/2006 | Rudland | ............ | H04L 12/185 455/3.01 |
| 2007/0165865 A1* | 7/2007 | Talvitie | ............ | H04L 63/0428 380/286 |
| 2007/0297452 A1* | 12/2007 | Lee | ............ | H04L 45/48 370/469 |
| 2009/0016249 A1* | 1/2009 | Li | ............ | H04J 3/0638 370/310.1 |
| 2009/0028070 A1* | 1/2009 | Matsuo | ............ | H04L 45/00 370/256 |
| 2009/0055691 A1* | 2/2009 | Ouksel | ............ | G01D 21/00 714/48 |
| 2009/0103533 A1* | 4/2009 | Li | ............ | H04L 41/0226 370/389 |
| 2009/0138444 A1* | 5/2009 | Kim | ............ | H04W 4/02 |
| 2010/0128653 A1* | 5/2010 | Tateson | ............ | H04L 1/188 370/315 |
| 2010/0149971 A1* | 6/2010 | Noriega | ............ | H04L 47/10 370/230 |
| 2011/0013640 A1* | 1/2011 | Farkas | ............ | H04L 12/4645 370/395.53 |
| 2011/0294431 A1* | 12/2011 | Erdmann | ............ | H04W 40/246 455/41.2 |
| 2012/0013440 A1* | 1/2012 | von Bose | ............ | G06K 17/0029 340/5.85 |
| 2012/0096138 A1 | 4/2012 | Lambert | | |
| 2012/0149385 A1* | 6/2012 | Hsuan | ............ | H04W 24/02 455/450 |
| 2012/0174220 A1* | 7/2012 | Rodriguez | ............ | H04L 63/1416 726/23 |
| 2012/0198037 A1* | 8/2012 | Shelby | ............ | H04L 41/0253 709/223 |
| 2012/0236778 A1* | 9/2012 | Erdmann | ............ | H04L 45/22 370/312 |
| 2015/0006758 A1 | 1/2015 | Holtman et al. | | |
| 2015/0085767 A1* | 3/2015 | Einhaus | ............ | H04L 1/0001 370/329 |
| 2017/0008162 A1* | 1/2017 | Tsubota | ............ | G05B 19/00 |
| 2017/0171838 A1* | 6/2017 | Wu | ............ | H04W 72/04 |
| 2017/0228795 A1* | 8/2017 | Papakostas | ............ | G06Q 30/0277 |
| 2017/0338989 A1* | 11/2017 | Wu | ............ | H04L 27/2621 |
| 2018/0302807 A1* | 10/2018 | Chen | ............ | H04L 45/22 |

FOREIGN PATENT DOCUMENTS

| | | | |
|---|---|---|---|
| JP | 2013005179 A | 1/2013 | |
| WO | WO-9917575 A2 * | 4/1999 | ............ H04W 16/14 |
| WO | 2010092530 A1 | 8/2010 | |
| WO | 2011070479 A1 | 6/2011 | |
| WO | 2013121325 A2 | 8/2013 | |
| WO | 2013121339 A2 | 8/2013 | |

\* cited by examiner

GREEN POWER FOR DENSE LARGE NETWORKS (PROXY TABLE SCALING)

FIELD OF THE INVENTION

The invention relates to the field of communication networks where proxy devices operate as relay devices to forward messages from resource restricted devices, such as—but not limited to—ZigBee Green Power Devices, to their destination devices in particular, the invention relates to effective proxy device assignment within these communication networks.

BACKGROUND OF THE INVENTION

In wireless networks, resource restricted devices, including energy-restricted devices such as energy-harvesting devices, can be used. Such devices are heavily restricted in the available amount of energy, which limits their offered functionality and influences the network operation, commissioning and maintenance.

One example of such technology is the evolving ZigBee Green Power (GP) standard. A ZigBee Green Power Device (ZGPD) is a resource restricted device which may be powered by energy harvesting and which may not have a battery or which may only have a small storage capacity. Thus, a resource restricted device can transmit and/or receive only at unscheduled opportunities. One example of such a resource restricted device is a battery-less switch that can only transmit for a short time once it has been actuated by a user, but has no reception capability. Another example of a resource restricted device is a battery-less switch that can receive for a short time once it has transmitted a signal upon actuation by a user. Yet another example of a resource restricted device is a periodically-reporting sensor, harvesting energy from its environment, e.g., by means of a photovoltaic cell, with or without reception capabilities. If an energy-restricted device is out of range of the device it is configured to control (the device to be controlled referred to as destination device), an intermediate device (referred to as a proxy device) is used for forwarding information to the destination device. Generally, any device within a network that has forwarding capability may act as a proxy device, including a destination device. The wireless links between the proxy device and the resource restricted device may appear and disappear during network lifetime, e.g., due to changes in propagation conditions or in relative location of devices, and/or due to devices being added and removed. For system security and performance reasons, the proxy devices may be required to only forward for resource restricted devices they have a table entry (i.e. proxy table entry) for, e.g., to be able to perform freshness and/or security check (authentication, decryption), direct the message to appropriate destination device(s), etc. For communication reliability, more than one proxy device may be used for forwarding information on behalf of one resource restricted device.

The above described concept, e.g. the concept of ZigBee Green Power, was designed having home networks in mind: with limited number of devices, rather sparsely distributed, and self-organizing (capable to operate in the temporary absence of any of the devices). The concept may generally be used in managed network, where any self-configuration or -discovery is disabled, and management functionality is defined, which can be performed by a central device or shared by a number of devices, taking responsibility for the proper configuration and operation. However, the offered solutions do not scale well in large, dense networks, especially the proxy device assignment, e.g. proxy table entry management may become critical for large, dense networks.

International patent application WO 2013121339 A2 describes several techniques for managing the contents of proxy tables in ways that optimize performance, latency, and reliability for communication networks, such as Zigbee Green Power networks, while ensuring a certain number of early-acting proxies per restricted device. An entity is allowed to keep a required number of proxies per resource-restricted device by removing or adding proxy table entries.

The ZigBee GP specification defines two ways of managing the proxy device assignment, e.g. managing proxy table entries: a global and local approach.

In the global approach, management functionality performed by, e.g. a central device, e.g. a Commissioning Tool (CT), a concentrator, or a destination device or performed by a number of devices, e.g. sink devices, is responsible for managing the proxy devices forwarding on behalf of a particular resource restricted device, by directly configuring their proxy tables. Automatic configuration and discovery by the proxies themselves may be switched off. This approach may require analysis of network topology, signal propagation characteristics, etc. Furthermore, management functionality intervention is required not only during commissioning, when each proxy table is initially set up, but also during operation, since propagation conditions may change when a resource restricted device, a destination device or a proxy device is moved, removed or added.

In the local approach, upon creation of a pairing between a resource restricted device and a destination device, the destination device just broadcasts a GP Pairing command, and all proxy devices with an empty proxy table entry may add a corresponding entry. If a proxy device does not know a resource restricted device it is receiving frames from (i.e. has no table entry for that resource restricted device), it can discover the resource restricted device by broadcasting a GP Pairing Search command and/or a broadcast GP Notification command. While this works in small, sparse networks, such a self-organizing approach will not scale up to large scale dense networks such as for instance professional lighting applications. Such a professional lighting application may be used to control the light in a plurality of rooms located for instance in a floor of an office building. Assuming twenty rooms on a wing of an office floor, each equipped with only two lamps (which is on the low side), and only one resource restricted device in form of a switch per office room of say 3 by 3 meters (again this is on the low side), there will be around forty proxy devices within the wireless communication range of each of the resource restricted devices as well as nineteen other resource restricted devices competing for the same proxy table space and air time. The minimal requirement made by the Green Power v1.0 standard (ZigBee document 095499r26) is for a proxy device to have ten proxy table entries. Having more entries increases the memory usage, since each entry can be several tens of bytes long and the Green Power v1.0 standard (ZigBee document 095499r26) requires it to be stored persistently across device power cycles. The resulting network thus has to deal with a large number of proxy devices per resource restricted device, resulting in very high traffic inter alia due to redundant signal forwarding, with a large number of discoveries per resource restricted device, since not all devices will fit in the tables of all proxies. The results are high traffic and table entry overflows. Consequently, in the distributed case, it cannot be guaranteed that there is at least one proxy table entry per resource restricted device.

SUMMARY OF THE INVENTION

It is an object of the invention to provide an efficient management of proxy device assignments in a network so as to achieve at least one of avoidance of proxy table overflow, avoidance of too many active proxies per resource restricted device (esp. in dense networks), guarantee of at least a single proxy device per resource restricted device (in dense networks), and optimal proxy device reliability.

Accordingly solutions are proposed for managing proxy device assignment in a wireless communication network in ways that optimize performance, latency, and reliability for the concerned network(s), while optimizing for a certain number of proxy devices per resource restricted device.

In an aspect of the invention, there is provided a method for managing proxy device assignment in a wireless communication network where proxy devices in the wireless communication network operate as relay devices forwarding signals from at least one resource restricted device to a destination device. The method comprises dividing an identifier space available to the resource restricted device into at least two parts, and assigning at least one of the at least two parts of the identifier space to at least one proxy device of the wireless communication network wherein the proxy device assigned to the at least one of the at least two parts of the identifier space is responsible for the resource restricted device transmitting a signal comprising an identifier falling within the first part of the identifier space.

The identifier space comprises all possible variants or combinations of an identifier. Signal transmissions within a wireless network require a predetermined format in which messages are communicated from the resource restricted device to the destination device via the proxy device. Generally, any information comprised in the signal transmission may be used as identifier. Examples could be a hardware address of the resource restricted device, a network address of the resource restricted device (i.e. an identifier assigned to the device upon joining a particular network, usually shorter than the hardware address), a serial number, a frame counter, a command ID, a device type, a manufacturer ID or a manufacturer part of the source ID or parts or combinations thereof. Alternatively, in particular for the proxy table creation, any destination information can be used instead, including hardware address, a network address, a serial number, a frame counter, a device type, a manufacturer ID or a manufacturer part of the address or parts or combinations thereof. The resulting identifier space is divided in at least two parts and at least one part is assigned to at least one proxy device within the network. In order to ensure coverage of the entire identifier space, each part should be assigned to at least one proxy device within the network. The proxy device that has been assigned to the at least one part of the identifier space is then responsible for at least one of selected tasks associated with forwarding signals related to a resource restricted device comprising an identifier falling within the first part of the identifier space. The tasks may include forwarding data frames, forwarding commissioning and configuration frames; from/to known or unknown devices, on behalf of bidirectional or transmit-only devices, and/or in a particular communication mode; with particular delay; with/without alias; buffering information about the resource restricted device, e.g. its capabilities, description, manufacturer/mode information, last reported values; handling queries for the resource restricted device, buffering communication for the resource restricted device; storing the proxy table entry related to the device, etc. Different rules for each message category or task associated with forwarding can be defined. Some tasks may need to be executed by each proxy, independently of the identifier space assignment; this can be implemented by assigning those tasks to all relevant proxies or by exempting the task from the identifier space checking rule. The tasks can be predefined or configurable. For example, to limit the table sizes, only the proxies with the matching address pool may store the table entries; in another example, to limit the amount of traffic, all proxies can store the table entries, but they only forward on behalf of resource restricted devices with identifier matching the address pool and transmitted commands with sequence number matching the sequence number pool. In yet another example, the address pool limitation may only be applied to devices capable of bidirectional communication and frames indicating the reception capability (which may not allow for usage of traffic reduction strategies such as aliasing), while the frames not indicating reception capability can be forwarded by all proxies. In yet another example, address pool limitation may only be applied to resource restricted device requiring unidirectional communication, while groupcast communication can be forwarded by all proxies. Each proxy device can be made responsible for selected part(s) of the identifier space, whereby responsible means handling tasks such as participating in commissioning, storing proxy table entries that refer to the resource restricted device, forwarding on behalf of and/or discovering pairings for the resource restricted device with an identifier within the corresponding identifier space part(s); forwarding data frames, forwarding commissioning and configuration frames; from or to known or unknown devices; different rules for each message category can be defined. As an example of the identifier division, the identifier may be a number between 0 and 99. A simple way of dividing the identifier space would be to assign all even numbers to a first part and all odd numbers to a second part. In case a division in more parts is desired, a division in four parts may be achieved by assigning all numbers with two even digits to a first part, those with a first even digit and a second odd digit to a second part, those with a first odd digit and a second even digit to a third part and those with two odd digits to fourth part. Whether the distribution will be uniform or result in equal parts of the identifier space depends on the division criterion which can be freely chosen depending on the needs of a concrete application. Furthermore, the number of parts can be fixed network-wide, or vary locally. It could vary e.g. with the density of the proxies, with the density of the resource restricted device, and/or with the amount of traffic generated in the network and/or by the resource restricted devices. It may also vary in the networks lifetime. Each proxy device may get assigned zero, one or more parts depending on network topology and signal propagation. Storing only those table entries in the proxy device table which fall within the parts of the identifier space assigned to the proxy device may boost the proxy table capacity of an N-proxy device set up to N-fold. Thereby, proxy table overflow can be avoided which helps to ensure that every resource restricted device within the network has a table entry in a proxy device. By assigning dedicated proxy devices to selected part(s) of the identifier space, the amount of redundant traffic can be reduced which effectively improves system performance. Different rules for each message category can be defined in relation to the identifier parts. For example, the proxy devices may forward data communication to and from known resource restricted device with the identifier falling into identifier space assigned to this proxy device. They may further be able to forward commissioning/configuration data or perform discovery on behalf of any resource restricted device, irrespective of the identifier, in order to increase chances that the commissioning information or information about unknown resource restricted devices is timely received. Alternatively, the proxy device may forward data communication to and from any resource restricted device it has a table entry for, irrespective of identifier, and only forward commissioning/configuration data or perform discovery on behalf of resource restricted device with the identifier falling into the identifier space assigned to this proxy device, to reduce the amount of traffic related to commissioning or discovery of unknown devices. The latter would also allow combining the advantages of global and distributed proxy table maintenance, e.g. allowing the management functionality to provide initial configuration of the proxy tables and allow the proxy device to report any changes and thus trigger proxy-table adaptation.

Applying the identifier space division to bidirectional communication with the resource restricted device potentially frees the destination device(s) from the task of selecting one particular proxy device that is to deliver the message to the resource restricted device, where the selecting of only one proxy may be dictated by the resource limitations of the resource restricted device, e.g. the very short period it will be able to be in receive mode, its inability to send acknowledgement upon message reception, etc.; and from the requirement of knowing/storing the identities of the proxy devices involved in resource restricted device forwarding.

In an embodiment of the invention the identifier is a static identifier, in particular an address of the resource restricted device and dividing an identifier space available to the resource restricted device is based on a predetermined number of least significant bits of the static identifier. By dividing the address space using a predetermined number of least significant bits provides a uniform distribution which covers the entire address space. The number of least significant bits used for the division controls the granularity of the division, e.g. if the last 2 bits are used, four parts are created, corresponding to bits 00, 01, 10 and 11, respectively. Eight parts may be realized by using the last 3 bits etc.

In an alternative embodiment the identifier is a non-static identifier, in particular a sequence number used by the resource restricted device and dividing an identifier space of the resource restricted device is based on a predetermined number of least significant bits of the changing identifier. Examples for non-static identifiers are, e.g. a sequence number or frame counter. This approach may promote the reliability of communication to and from the resource restricted devices and/or benefit mobile resource restricted devices.

In an embodiment of the invention assigning at least one part of the identifier space to at least one proxy device of the wireless communication network comprises randomly selecting the proxy device to which the at least one part of the identifier space is assigned to. By selecting the proxy device in a random manner a minimum of user interaction is required for set up and maintenance of the system.

In an embodiment of the invention assigning at least one part of the identifier space to at least one proxy device of the wireless communication network is performed based on a predetermined relationship between an identifier of the proxy device and the part of the identifier space. An exemplary relationship could be established using the bit combination in the proxy devices own identifier, e.g. its IEEE address, to assign a particular part of the divided identifier space. Other fixed identifiers, e.g. model ID or short (network) address could be used. This benefits scenarios where allocation of proxy device to resource restricted device should be static, e.g. because proxy table entries shall be stored, the resource restricted device commands are time critical or the resource restricted device resides at a fixed location. Alternatively a changing parameter, e.g. sequence number or frame counter, could be used to assign parts of the address space to a particular proxy device or particular proxy devices. This may promote the reliability of communication to and from the resource restricted devices and/or benefit mobile resource restricted devices. By explicitly assigning a part of the identifier space to particular proxy devices, the number of proxies per resource restricted devices may be better controlled, in particular in case of fixed device locations.

In an embodiment of the invention the division of the identifier space is dynamically adapted. That way, the network may compensate for local or temporary traffic fluctuations. The adaptation may be performed by a management protocol run either by a management device or distributed over at least two of the proxy devices. It is to be noted that a proxy device may take the role of the management device in an exemplary embodiment.

According to a further aspect of the invention, there is provided a non-transitory computer readable medium comprising a computer readable program, wherein the computer readable program when executed on a computer causes the computer to perform the method for managing proxy device assignment in a wireless communication network where proxy devices operate as relay devices forwarding signals from a resource restricted device to a destination device as described herein above.

According to a further aspect of the invention, there is provided a proxy device adapted to operate as a relay device between a resource restricted device and a destination device. The proxy device comprises a controller being arranged for determining if the proxy device is responsible for at least one part of an identifier space available to the resource restricted device, said part of identifier space determining at least one selected task associated with forwarding signals related to a resource restricted device comprising an identifier belonging to the determined part of the identifier space. The proxy device further comprises a communication module adapted for performing the selected tasks for at least one resource restricted device having an identifier belonging to the determined part of the identifier space.

According to a further aspect of the invention, there is provided a system for wireless communication between a resource restricted device and a destination device. The system comprises at least one resource restricted device, at least one destination device and a plurality of proxy devices to operate as relay devices forwarding signals between the at least one resource restricted device and the at least one destination device. The system comprises further at least one management unit adapted for dividing an identifier space available to the resource restricted device into at least two parts, said management unit being further adapted for at least one of: assigning at least one of the at least two parts of the identifier space to at least one first proxy device of the plurality of proxy devices and/or assigning to the at least one first proxy device or to the at least one of the at least two parts of the identifier space at least selected tasks associated with forwarding signals related to a resource restricted device comprising an identifier belonging to said one of the at least two parts of the identifier space, so that the first proxy device is responsible for at least selected tasks associated with forwarding signals related to the resource restricted device comprising an identifier falling within the first part of the identifier space.

In an embodiment of the invention, the first proxy device assigned to a first part of the identifier space is adapted to monitor the forwarding done by other proxy devices responsible for transmissions with identifiers outside the first part of the identifier space. That way, the proxy device in a cluster can make sure that all resource restricted device IDs are handled over the lifetime for the network. The monitoring may comprise communicating with each other, e.g. when the address space part corresponds to the IEEE address of the proxy device, the proxy device's appearance/disappearance and the resulting impact of the signal forwarding may be determined based on regular network communication, e.g. link status messages, the observation of the forwarded messages, the analysis of the proxy table status, etc.

Accordingly solutions are proposed for managing proxy device assignment in a wireless communication network in ways that optimize performance, latency, and reliability for the concerned network(s), while optimizing for a certain number of proxy devices per resource restricted device.

All solutions as defined in the independent method, computer program and system claims relate to interrelated products or alternative solutions to the above object, which are linked by the general common concept of balancing the use of proxy devices for resource restricted devices by managing proxy table entries for resource restricted devices based on a division of the identifier space available to the resource restricted devices and a selective assignment to dedicated proxy devices within the network.

It shall be understood that the method for managing proxy device assignment of claim 1, the non-transitory computer readable medium comprising a computer readable program for managing proxy device assignment of claim 7 and the system for wireless communication between a resource restricted device and a destination device of claim 8 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments are now described based on a mesh network containing one or more resource restricted device that can send messages by putting them into packets for wireless communication but are restricted in their ability to send many or long wireless packets, and restricted in their ability to listen for packets over long time periods or receive at all (e.g., devices powered by energy scavenging mechanisms), one or more destination devices that should receive and act upon messages from the resource restricted device, where the messages may be encoded into one or more packets, and the encoding of the message in a packet may change on a hop-by-hop basis, and the messages can be delivered in anycast, unicast, multicast, groupcast or broadcast communication mode, one or more proxy devices that help deliver messages from the resource restricted device beyond the (radio) range of the resource restricted devices, and/or help delivering them in the required message format and/or a more reliable way by taking special actions (e.g., delivering the message onwards to a destination device) when they receive a packet from a resource restricted device. The proxy devices usually have more power than the resource restricted devices, such that they can do additional message processing, use different message formats with longer messages, are able to format messages according to a different protocol, do re-try actions or route discovery actions on behalf of the resource restricted device, etc. Optionally, one or more router devices may be provided, that cannot act as a proxy device but can route messages sent by a proxy device towards a destination device. The network is called a 'mesh' network to indicate that the nodes participating in the network are capable of using at least one device that is capable of acting as a relay for a message; proxy and router are examples of such relay functionality.

Figure 1:
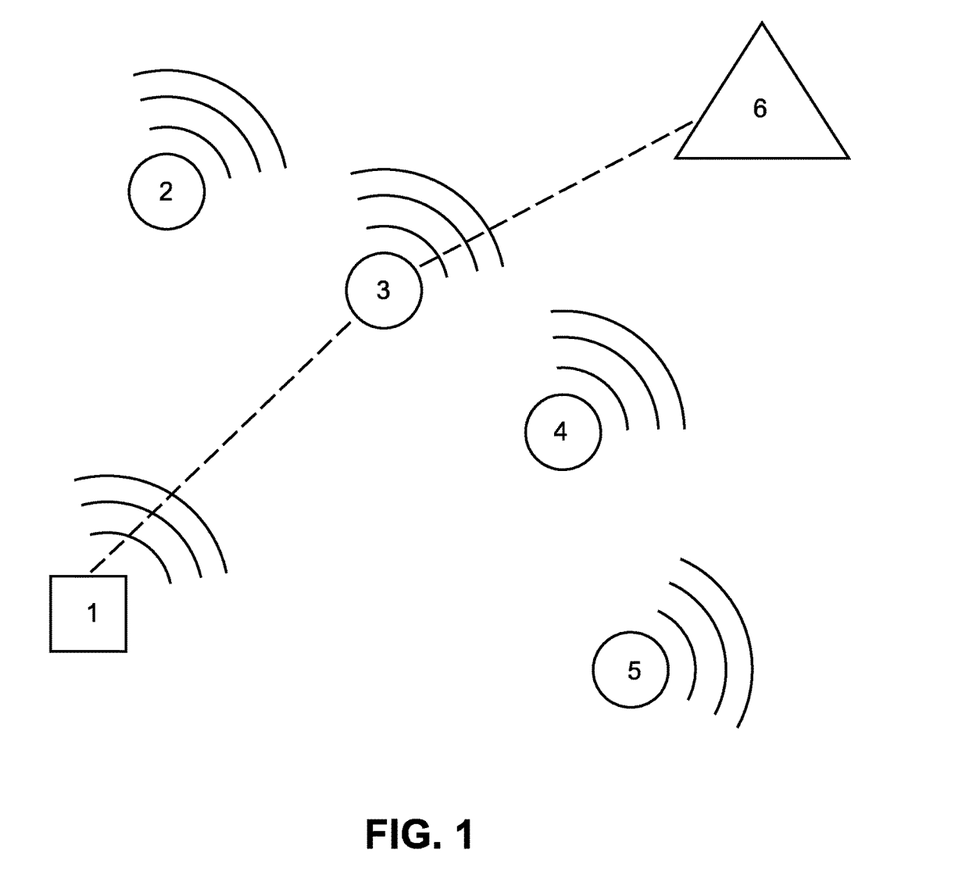
FIG. 1 shows an exemplary embodiment of the present invention.

FIG. 1 shows a wireless communication network (e.g. a network including devices supporting the ZigBee Green Power (ZGP) protocol) in which a resource restricted device 1 communicates with a destination device 6 over proxy device 3. Proxy devices 2, 4 and 5 which are also located within the communication range of resource restricted device 1 do not forward any communication to destination device 6 on behalf of resource restricted device 1. Such a proxy device assignment may be achieved using the resource restricted device's ID, e.g. a source ID or the IEEE address. The resulting address space available to any resource restricted device within the network would then be the space of all addresses representable by a given number of bits. This address space may be divided by using the least significant bits of the resource restricted device's ID. If the last 2 bits of an ID are used, 4 parts may be created, corresponding to bit combinations 0b00, 0b01, 0b10 and 0b11, respectively. Each proxy device 2, 3, 4 and 5 can be assigned one of those parts, leading to 4 proxy devices covering the entire address space, and providing a four-fold capacity, e.g. in terms of number of proxy table entries, each entry recording details for a specific resource restricted device, that can be present in the system as a whole. Accordingly, only one proxy device, here proxy device 3, will store a table entry for resource restricted device 1 and correspondingly forward communication to destination device 6 on behalf of resource restricted device 1.

Figure 2:
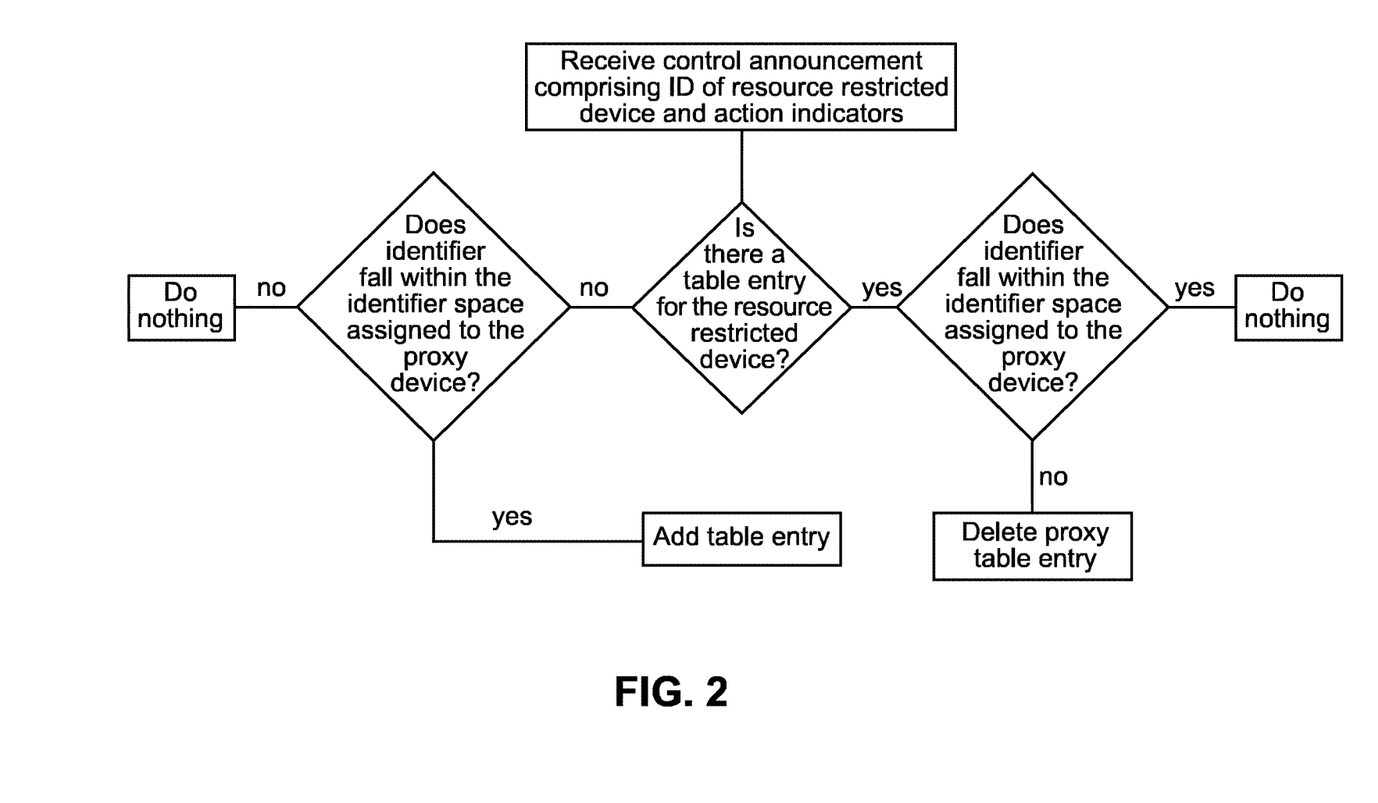
FIG. 2 shows an exemplary state flow diagram during commissioning mode.

A proxy device may store a table entry during commissioning as depicted in FIG. 2, where the destination device or a commissioning tool sends a control announcement informing the proxy device(s) about the new control relationship created, including at least an identifier of the resource restricted device and the corresponding destination device(s). This control announcement can be sent by (range-limited) broadcast; if the resource restricted device's ID indicated in the control announcement falls within the address space of the proxy device receiving the control announcement, then the proxy device will add a table entry. This frees the transmitter of the task of selecting a number of proxies and addressing them in unicast. This behavior can be pre-programmed, wherein the proxies by default only store the control announcements with resource restricted device's ID matching the proxy's address space. Alternatively, the control announcement can be enhanced with action indicator(s) for proxy devices. Depending on whether the resource restricted device's ID in the control announcement falls within and/or outside the address space of a proxy device, a particular action may be executed. An example of such action indicators is depicted in FIG. 2. The proxy devices with the matching address space can be instructed to add a table entry, or keep it, if the table entry already exists. The proxy devices with non-matching address space can be asked to remove a corresponding table entry; one or more messages can be used for this purpose. In extension, such indicators can also be provided in other commands, e.g. triggering commissioning/maintenance actions, etc. This way, more complex strategies can be realized, e.g. allowing all proxy devices to participate in commissioning and then limiting the number of proxy table entries. Furthermore, this enables for flexible selection of the number of forwarding proxy devices per resource restricted device, which may be based on the device's capability, importance, location, application, frequency of communication, security model used, real-time operation requirements, mobility requirements, etc. This way, some resource restricted devices can e.g. be represented by all proxy devices, while some other can e.g. be represented by one proxy group corresponding to one address pool. In extension, proxy devices can use additional criteria (e.g. current fullness of the table, the fact of being in the radio range of that device, connectedness to other network devices, communication mode requested by the destination, number of destinations, etc.) to influence their decision to add the proxy table entry.

During operation, proxy table entry creation can be achieved at the proxy device by receiving an unsolicited control announcement, or by receiving a communication from an unknown resource restricted device and by seeing other proxy device(s) forwarding it, or by receiving a communication from an unknown resource restricted device and making a query for control relationships (e.g. GP Pairing Search command or broadcast GP Notification command). This process is also referred to as discovery of an unknown resource restricted device. It may occur, e.g. because the resource restricted device is new or moved, the proxy device is new, restarted, rebooted or moved, propagation conditions changed, etc.

Figure 3:
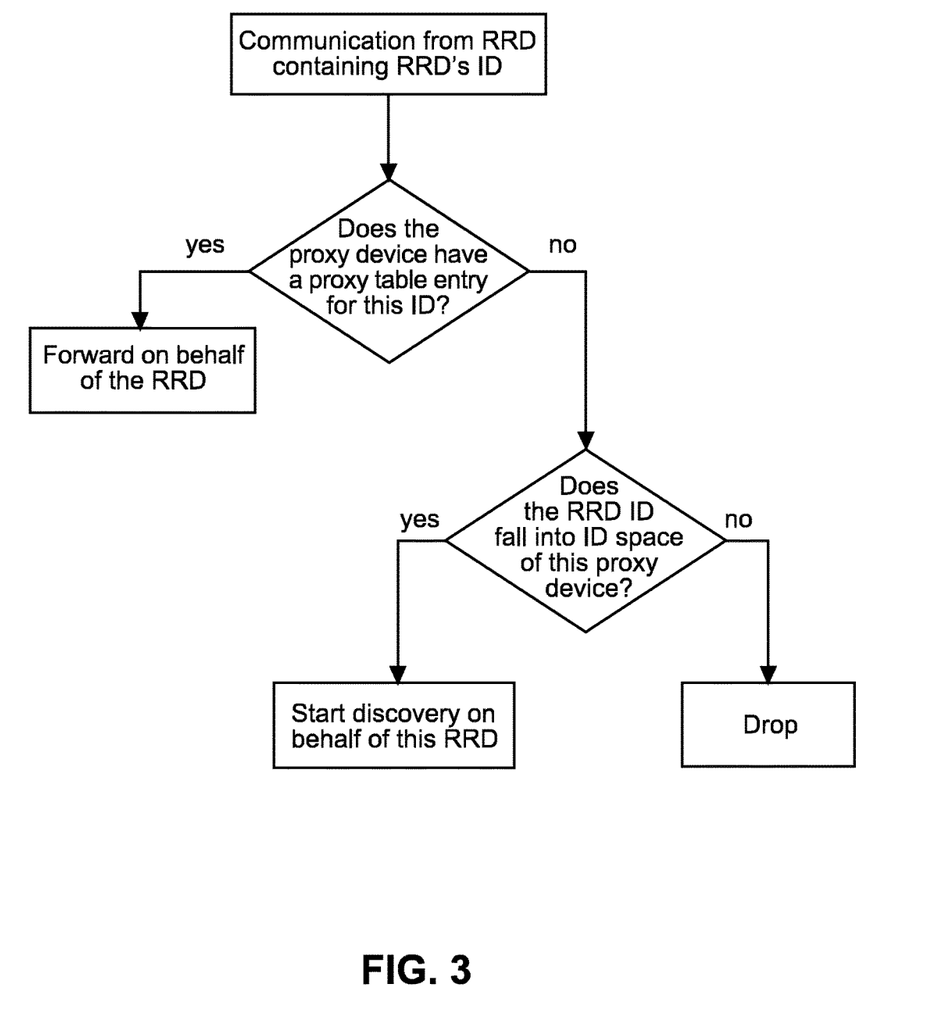
FIG. 3 shows an exemplary state flow diagram during operation mode for a resource restricted device (RRD).

Having dedicated proxy devices assigned to resource restricted device and destination device pairings does not only boost the table entry capacity within a proxy device cluster, it also reduces the amount of traffic significantly, in particular in case of unicast forwarding or regular groupcast (when each proxy device triggers a separate groupcast/broadcast message). This will be beneficial even if other techniques to limit the amount of forwarding traffic are used, e.g. those proposed by the ZigBee GP specification, such as aliasing (replacing the source information of the individual proxy devices by an alias address, derived in a pre-defined manner from the identifier of the resource restricted device or pre-configured, thus resulting in one groupcast message despite the many independently forwarding proxies) or dropping the scheduled forwarding on reception of the same message being forwarded by another proxy. An exemplary state flow diagram in FIG. 3 illustrates the above described beneficial traffic reduction. Generally, all proxy devices already having a proxy table entry for a particular resource restricted device can forward on behalf of that resource restricted device, irrespective of whether the resource restricted device's ID falls within the address pool of that particular proxy device. This can be required, e.g. if a commissioning tool selects dedicated proxy devices for a particular resource restricted device, e.g. because of their position, characteristics, quality of the communication link to the resource restricted device, etc.; and the limitation of forwarding traffic may be taken care of by other means mentioned above, like the aliasing, or by the selection process of the proxy devices. When the proxy device however receives a message from an unknown resource restricted device, i.e. a resource restricted device for which the proxy device does not have a table entry, the proxy device may be configured to only start the discovery process if the resource restricted device's ID falls within the address pool of that particular proxy device; this way the number of discovery messages is reduced.

All proxy devices forward the command in identical ZigBee frames with the same source address and sequence number both derived from the ZigBee Green Power command frame. This allows a proxy device receiving a forwarded ZigBee Green Power command from another proxy device to recognize it as a duplicate and discard it. Having only dedicated proxy devices like proxy device 3 forwarding on behalf of a resource restricted device (RRD) 1, reduces redundant transmissions of tunneled commands as well as transmission of a tunneling stop command preceding a unicast forwarding in full unicast communication mode.

In order to ensure that all resource restricted devices are handled over the entire lifetime of the network the proxy devices 2, 4 and 5 may monitor the forwarding done by proxy device 3 and the other way round. When the address space part assigned to proxy device 3 corresponds to the IEEE address of the proxy device, the proxy device(s) appearance/disappearance and the resulting impact on the message forwarding may be determined based on regular ZigBee communication, e.g. Link Status messages. Alternatively, another proxy (not depicted in FIG. 1), e.g. one not tasked with forwarding on behalf of any address pool can take this role.

In a first variant of the above embodiments, the proxy devices are pre-configured to selectively perform the tasks associated with forwarding. The preconfiguration may cover at least one of the following aspects: division of the identifier space, assignment of the parts of the identifier space to particular proxies and assignment of the tasks associated with forwarding signals related to the resource restricted device for particular proxy and/or identifier space. This preconfiguration may be carried out by the installer or the manufacturer, upon designing the network. In another example, the division of the network is decided and operated by a central device, for example a trust center or a network controller. In this case, the decision of dividing the identifier space may be taken for example upon detection that a ratio of the number of proxy devices to the number of resource restricted devices is above a threshold. For example, if the threshold is in the interval [3-4] (i.e. 3-4 proxy devices for a resource restricted device), a division of the identifier space into 2 identifier subspaces may be decided. Several thresholds may correspond to different identifier space division. For example, if the average ratio is detected to change from [2-4] to greater than 4, the identifier space may be divided again. The decision may be based on a whole network average ratio or on localized ratio high values. In this latter case, the identifier space may be divided only locally, around the detected ratio high value zone. Other decision criteria may be taken into account individually or in combination with the above decision criterion. The assignment of the tasks associated with forwarding of signals related to the resource restricted device may be done by upgrading the firmware of a particular proxy, by sending control commands, by activating pre-defined tasks, e.g. via a feature bitmap, etc.; the proxies can be addressed individually or in groups, e.g. all proxies responsible/not-responsible for a particular part of the identifier space.

In another example, there may be fixed rules defining the assignment, e.g. in a standard or in the implementation. For example, the identifier space may always be divided into two parts, the identifier falling into identifier space assigned to this proxy device can be defined as the least significant bit of the proxy IEEE address matching the lease significant bit of the identifier of the resource restricted device, and the fixed task includes sending discovery messages only on behalf of unknown resource restricted devices with an identifier falling into identifier space assigned to this proxy device.

In yet another example, the proxy nodes decide collectively or individually of the division of the network, without intervention of a central device. This solution is adapted for example in some embodiments of mesh networks. In this case, a proxy node comprises a controller which is coupled to its communication module. The proxy node controller may for example detect that the number of detected entries in the proxy table is above a threshold. In this case, the proxy node may in an example inform other proxy nodes of the situation in order to cause an identifier space split for all proxy nodes in the vicinity of the detection. In another example, each proxy node facing the situation can decide on its own to take the responsibility only for a part of the identifier space. The selection of the identifier space may be decided for example randomly (e.g. by comparing its own address LSB(s)), or by selecting the identifier space in which the proxy node still has most entries.

As discussed above, the decision criterion may be different or combined with other decision criteria, for example the ratio of the number of proxy devices to the number of resource restricted devices.

In an intermediate example, the proxy devices may signal to the central device that their proxy table is getting a large number of entries. In a first variant, the central device can decide to configure the proxy devices to operate the identifier space split after reception of this signaling (or reception of a sufficient number of signaling). In a second variant, a first proxy device decides to perform the identifier space split and signals such decision to the central device which can inform other proxy devices around the first proxy device to perform accordingly.

It is to be noted that in examples of all the above embodiments, the destination devices may also take the role of proxy device in the network for neighboring restricted devices. Conversely, the proxy devices may also be destination devices for some messages.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Method for managing proxy device assignment in a wireless communication network characterized in that proxy devices in the wireless communication network operate as relay devices forwarding signals from a resource restricted device to at least one destination device, the method comprising:
    dividing an identifier space available to the resource restricted device into at least two parts, and
    assigning at least one of the at least two parts of the identifier space to at least one proxy device of the wireless communication network wherein the proxy device assigned to the at least one of the at least two parts of the identifier space is responsible for at least selected tasks associated with forwarding signals related to the resource restricted device comprising an identifier falling within the first part of the identifier space.

2. Method according to claim 1, wherein the identifier is a static identifier, in particular an address of the resource restricted device, and dividing an identifier space of the resource restricted device is based on a predetermined number of least significant bits of the static identifier.

3. Method according to claim 1, wherein the identifier is a non-static identifier, in particular a sequence number used by the resource restricted device and dividing an identifier space of the resource restricted device is based on a predetermined number of least significant bits of the non-static identifier.

4. Method according to claim 1, wherein assigning the at least one part of the identifier space to at least one proxy device of the wireless communication network comprises randomly selecting the proxy device to which the at least one part of the identifier space is assigned to.

5. Method according to claim 1, wherein assigning the at least one part of the identifier space to at least one proxy device of the wireless communication network is performed based on a predetermined relationship between an identifier of the proxy device and the part of the identifier space.

6. Method according to claim 1, further comprising dynamically adapting the division of the identifier space.

7. Method according to claim 1, wherein the selected tasks comprise at least one of participating in commissioning, storing a proxy table entry, forwarding data frames, commissioning and/or configuration frames on behalf of the resource restricted device, forwarding data frames, commissioning and/or configuration frames on behalf of transmit-only resource restricted device, forwarding data frames, commissioning and/or configuration frames on behalf of resource restricted device capable of bidirectional communication, forwarding using a particular communication mode, discovering pairings for the resource restricted device, handling bidirectional communication with the resource restricted device, buffering information about the resource restricted device, handling queries for the resource restricted device, buffering communication for the resource restricted device; with particular delay; with or without an alias and combinations thereof.

8. A non-transitory computer readable medium comprising a computer readable program, wherein the computer readable program when executed on a computer causes the computer to perform a method of for managing proxy device assignment in a wireless communication network characterized in that proxy devices in the wireless communication network operate as relay devices forwarding signals from a resource restricted device to at least one destination device, the medium comprising code for:

dividing an identifier space available to the resource restricted device into at least two parts, and assigning at least one of the at least two parts of the identifier space to at least one proxy device of the wireless communication network wherein the proxy device assigned to the at least one of the at least two parts of the identifier space is responsible for at least selected tasks associated with forwarding signals related to the resource restricted device comprising an identifier falling within the first part of the identifier space.

9. A proxy device adapted to operate as a relay device between a resource restricted device and a destination device, characterize in that said proxy device comprising
- a controller being arranged for determining if the proxy device is responsible for at least one part of an identifier space available to the resource restricted device, said part of identifier space determining at least one selected task associated with forwarding signals related to a resource restricted device comprising an identifier belonging to the determined part of the identifier space,
- a communication module adapted for performing the selected tasks for at least one resource restricted device having an identifier belonging to the determined part of the identifier space.

10. System for wireless communication between a resource restricted device and a destination device, the system comprising:
- at least one resource restricted device,
- at least one destination device, the system characterized in that it further comprises:
- a plurality of proxy devices to operate as relay devices forwarding signals between the at least one resource restricted device and the at least one destination device, the system comprising:
- at least one management unit adapted for dividing an identifier space available to the resource restricted device into at least two parts, said management unit being adapted for at least one of:
- assigning at least one of the at least two parts of the identifier space to at least one first proxy device of the plurality of proxy devices and/or
- assigning to the at least one first proxy device or to the at least one of the at least two parts of the identifier space at least selected tasks associated with forwarding signals related to a resource restricted device comprising an identifier belonging to said one of the at least two parts of the identifier space, so that the first proxy device is responsible for at least selected tasks associated with forwarding signals related to a resource restricted device comprising an identifier falling within the first part of the identifier space.

11. System according to claim 10, wherein the management unit is adapted to assign at least one part of the identifier space to at least one proxy device of the wireless communication network in a random manner.

12. System according to claim 10, wherein the management unit is adapted to assign the at least one part of the identifier space to at least one proxy device of the wireless communication network based on a predetermined relationship between an identifier of the proxy device and the part of the identifier space.

13. System according to claim 10, wherein the management unit is adapted for dynamically adapting the division of the identifier space.

14. System according to claim 13, wherein the management unit is comprised in a management device or is distributed over at least two proxy devices of the plurality of proxy devices.

15. System according to claim 13, wherein the first proxy device assigned to a first part of the identifier space is adapted to monitor the forwarding done by other proxy devices responsible for transmissions with identifiers outside the first part of the identifier space.

* * * * *